US011368850B2

(12) United States Patent
Smith

(10) Patent No.: US 11,368,850 B2
(45) Date of Patent: Jun. 21, 2022

(54) DATA MODEL VISIBILITY IN IOT NETWORK IMPLEMENTATIONS

(71) Applicant: Intel Corporation, Santa Clara, CA (US)

(72) Inventor: Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 299 days.

(21) Appl. No.: 16/614,207

(22) PCT Filed: Jun. 21, 2018

(86) PCT No.: PCT/US2018/038810
§ 371 (c)(1),
(2) Date: Nov. 15, 2019

(87) PCT Pub. No.: WO2018/237176
PCT Pub. Date: Dec. 27, 2018

(65) Prior Publication Data
US 2021/0368344 A1 Nov. 25, 2021

Related U.S. Application Data

(60) Provisional application No. 62/523,065, filed on Jun. 21, 2017.

(51) Int. Cl.
H04W 12/71 (2021.01)
H04W 4/70 (2018.01)
(Continued)

(52) U.S. Cl.
CPC ............. H04W 12/71 (2021.01); H04W 4/70 (2018.02); H04W 8/005 (2013.01); H04W 8/26 (2013.01); H04W 12/02 (2013.01); H04W 12/75 (2021.01)

(58) Field of Classification Search
CPC ....... H04W 12/71; H04W 4/70; H04W 8/005; H04W 8/26; H04W 12/02; H04W 12/75;
(Continued)

(56) References Cited

U.S. PATENT DOCUMENTS

2009/0300723 A1* 12/2009 Nemoy ................. H04L 63/102
726/4
2017/0126834 A1* 5/2017 Fransen .................. H04L 67/12
2018/0183587 A1* 6/2018 Won ...................... H04L 9/0891

FOREIGN PATENT DOCUMENTS

WO WO-2018237176 A1 12/2018

OTHER PUBLICATIONS

"International Application Serial No. PCT US2018 038810, International Preliminary Report on Patentability dated Jan. 2, 2020", 8 pgs.

(Continued)

Primary Examiner — Erica Navar
(74) Attorney, Agent, or Firm — Schwegman Lundberg & Woessner, P.A.

(57) ABSTRACT

Various systems and methods of establishing data model visibility in IoT network implementations, through an internal data model and external data model and associated data representations are described herein. In an example, a data representation is defined for a data set that corresponds to an internal (a not externally visible data model), where there is a permutation or change of the data that is applied before it is revealed or made visible externally. Such data permutations and state changes may be used to qualify some aspect of the internal model to be made visible to the external model, for a variety of IoT network use cases.

25 Claims, 8 Drawing Sheets

(51) Int. Cl.
  *H04W 12/75* (2021.01)
  *H04W 8/00* (2009.01)
  *H04W 8/26* (2009.01)
  *H04W 12/02* (2009.01)
(58) Field of Classification Search
  CPC ......... H04W 4/02; H04W 4/029; H04W 4/80; H04L 12/4625; H04L 63/0407; H04L 63/102; H04L 67/1044; H04L 67/12; H04L 67/16; H04L 67/303
  See application file for complete search history.

(56) References Cited

OTHER PUBLICATIONS

"International Application Serial No. PCT/US2018/038810, International Search Report dated Aug. 28, 2018", 3 pgs.
"International Application Serial No. PCT/US2018/038810, Written Opinion dated Aug. 28, 2018", 6 pgs.
Ford-Long, Wong, et al., "Location Privacy in Bluetooth", Security and Privacy in Ad-Hoc and Sensor Networks Lecture Notes in Computer Science Springer Berlin, (Jan. 1, 2005), 176-188.

* cited by examiner

DATA MODEL VISIBILITY IN IOT NETWORK IMPLEMENTATIONS

PRIORITY CLAIM

This application is a U.S. National Stage Application under 35 U.S.C. 371 from International Application No. PCT/US2018/038810, filed Jun. 21, 2018, published as WO 2018/237176, which claims the benefit of priority to U.S. Application Ser. No. 62/523,065, filed Jun. 21, 2017, all of which are incorporated herein by reference in their entirety.

TECHNICAL FIELD

Embodiments described herein generally relate to interconnected device networks, and in particular, to techniques for implementing data models within internet of things (IoT) devices and device networks.

BACKGROUND

IoT devices are physical objects that may communicate on a network, and may include sensors, actuators, and other input/output components, such as to collect data or perform actions from a real-world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated.

Various standards have been proposed to more effectively interconnect and operate IoT devices and IoT network use cases. These include the specialization of communication standards distributed by groups such as Institute of Electrical and Electronics Engineers (IEEE), and the specialization of application interaction architecture and configuration standards distributed by groups such as the Open Connectivity Foundation (OCF).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, methods, configurations, and related apparatuses are disclosed for establishing data model visibility and data model differentiation in an internet of things (IoT) device interconnection setting, from the use of internal facing (e.g., private) and external facing (e.g., public) data models. The use and configuration of the presently described data model configurations may be applicable in networks and systems of devices such as in implementations of Open Connectivity Foundation (OCF) standard-based networks and devices (including fog implementations, for a network of devices operating as a fog).

As discussed herein, the following internally-facing and externally-facing data model configurations may implement a data model abstraction that provide a simplified representation of data and removes unnecessary characteristics from an external, public-facing data schema. In an example, this data model abstraction is provided from a data set that corresponds to an internal or private data model (e.g., a data model not externally or publicly visible), that is transformed (e.g., has a permutation or change applied to the data) before the private data is revealed or made visible externally. Such data permutations and state changes may be used to qualify some aspect of the internal data model that is conditionally provided via the external data model, for a variety of IoT network use cases and technical implementations.

In contrast to the techniques described herein, prior versions of the OCF specification define various "interfaces" where a server (e.g., a sensor) may define multiple possible ways in which a client may interact with it. For example, if the client only wants to access "sensed" values, the server may define an "interface" that only reveals the properties or attributes that are read-only. However, such interfaces are not able to provide complete exposure of a protected or an internal data model; such interfaces are not tied to permutations or changes from data that would be exchanged between an internal data model and an external data model; and such interfaces are directly tied to (and unable to circumvent) a fixed data model interface. These and other technical limitations from conventional approaches are overcome based on the data model management techniques discussed below.

As used herein, a "device" refers to a logical entity that assumes one or more roles (e.g., as a client or server); a "service" refers to a functionality or group of functionalities that are provided by an entity (such as a device) for a specific purpose, such as to perform a task, manage some data, or perform some other activity. Examples of device and service implementations are provided in the following discussion.

Figure 1:
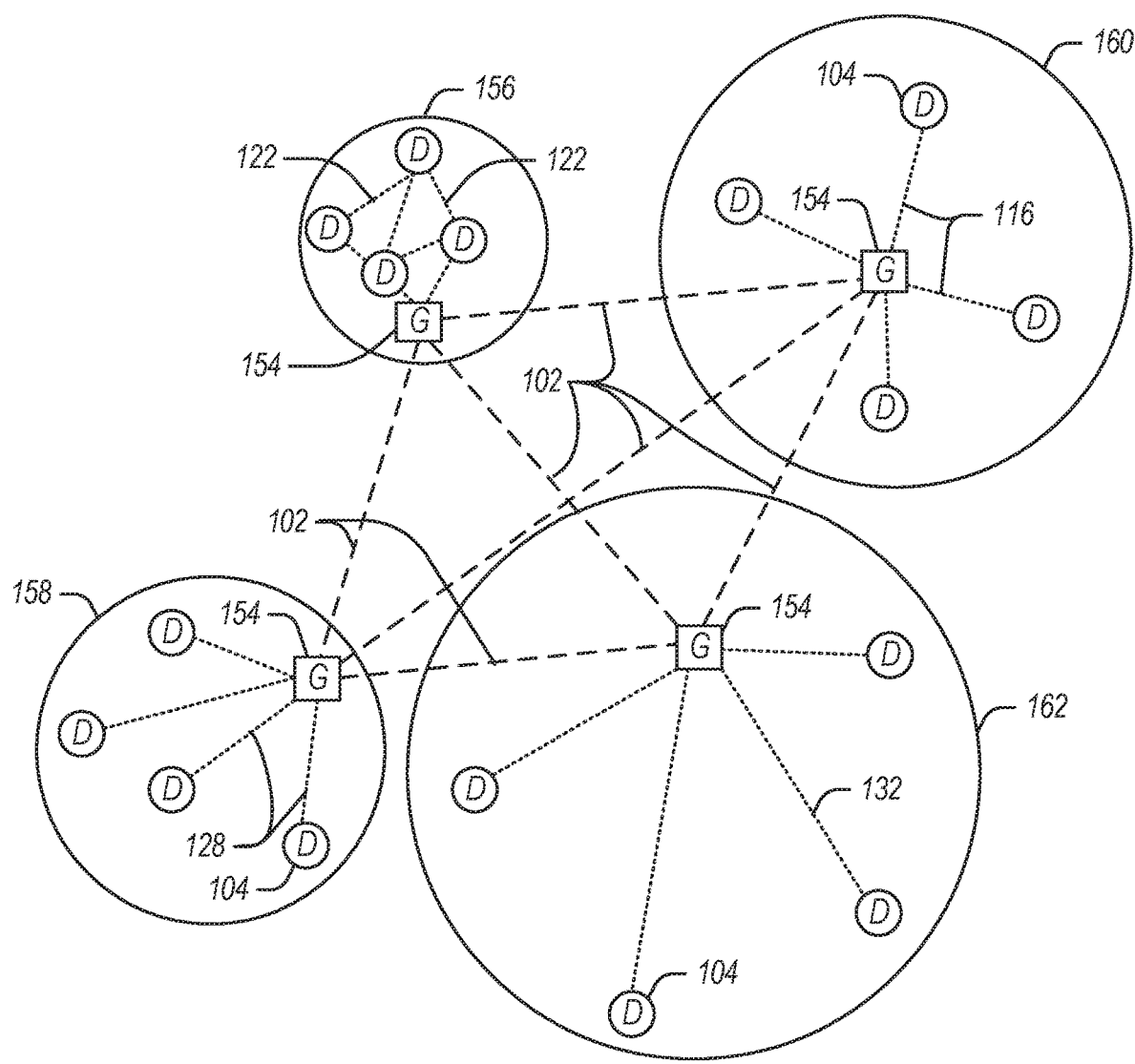
FIG. 1 illustrates a domain topology for respective internet of things (IoT) networks coupled through links to respective gateways, according to an example.

FIG. 1 illustrates an example domain topology for respective IoT networks coupled through links to respective gateways. The IoT supports deployments in which a large number of computing devices are interconnected to each other (and to the Internet) to provide functionality and data acquisition at very low levels. Thus, as used herein, an IoT device may include a semiautonomous device performing a function, such as sensing or control, among others, in communication with other IoT devices and a wider network, such as the Internet.

Often. IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 2:
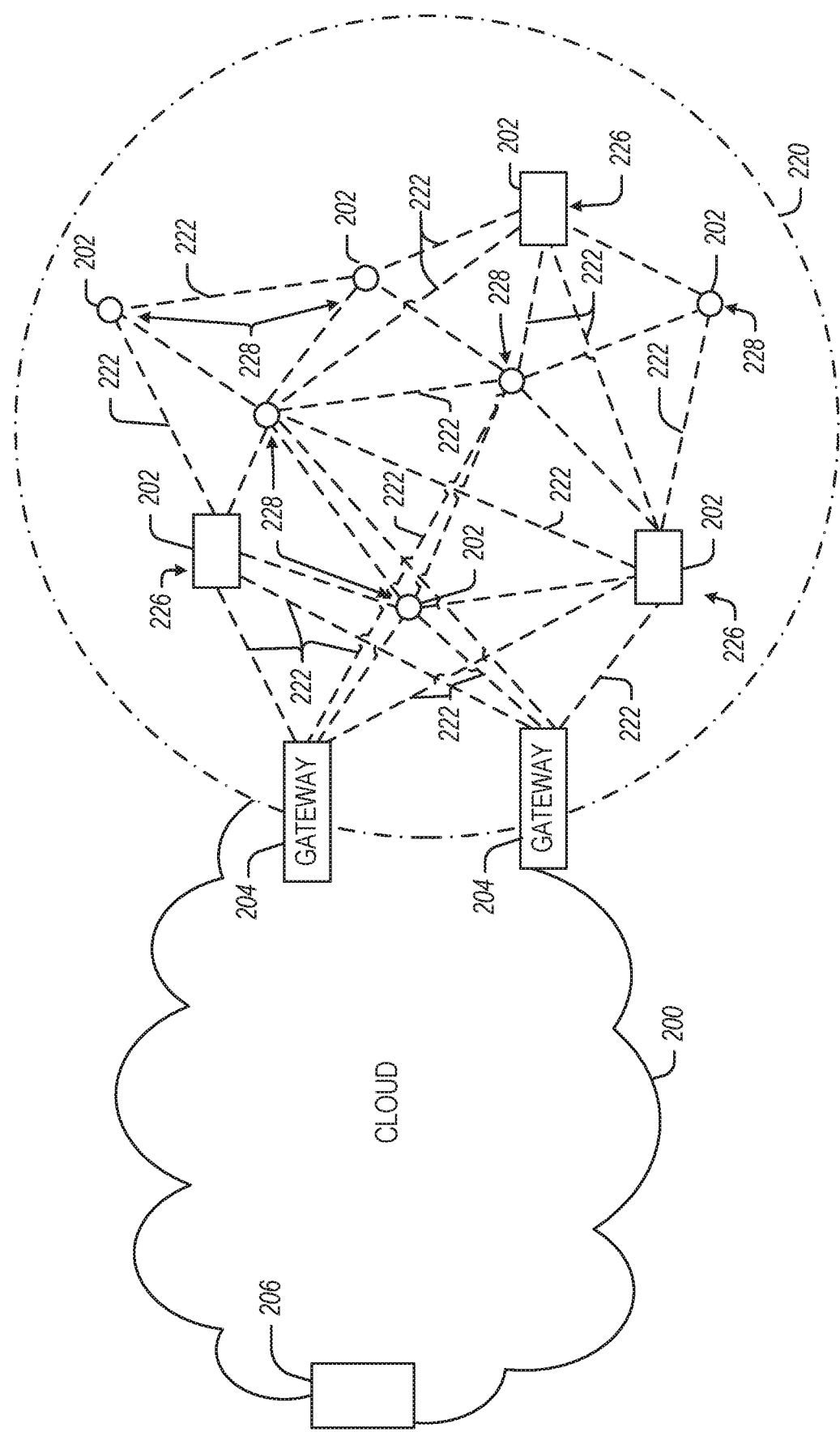
FIG. 2 illustrates a cloud computing network in communication with a mesh network of IoT devices operating as a fog platform in a networked scenario, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 1 and 2, present a number of new challenges in a heterogeneous network of connectivity comprising a combination of wired and wireless technologies.

FIG. 1 specifically provides a simplified drawing of a domain topology that may be used for a number of IoT networks comprising IoT devices 104, with the IoT networks 156, 158, 160, 162, coupled through backbone links 102 to respective gateways 154. For example, a number of IoT devices 104 may communicate with a gateway 154, and with each other through the gateway 154. To simplify the drawing, not every IoT device 104, or communications link (e.g., link 116, 122, 128, or 132) is labeled. The backbone links 102 may include any number of wired or wireless technologies, including optical networks, and may be part of a local area network (LAN), a wide area network (WAN), or the Internet. Additionally, such communication links facilitate optical signal paths among both IoT devices 104 and gateways 154, including the use of MUXing/deMUXing components that facilitate interconnection of the various devices.

The network topology may include any number of types of IoT networks, such as a mesh network provided with the network 156 using Bluetooth low energy (BLE) links 122. Other types of IoT networks that may be present include a wireless local area network (WLAN) network 158 used to communicate with IoT devices 104 through IEEE 802.11 (Wi-Fi®) links 128, a cellular network 160 used to communicate with IoT devices 104 through an LTE/LTE-A (4G) or 5G cellular network, and a low-power wide area (LPWA) network 162, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 104, such as over the backbone links 102, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and QoS-based swarming and fusion of resources. Some of the individual examples of network-based resource processing include the following.

The mesh network 156, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 158, for instance, may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 160, for instance, may be enhanced by systems that offload data, extend communications to more remote devices, or both. The LPWA network 162 may include systems that perform non-Internet protocol (IP) to IP interconnections, addressing, and routing. Further, each of the IoT devices 104 may include the appropriate transceiver for wide area communications with that device. Further, each IoT device 104 may include other transceivers for communications using additional protocols and frequencies. This is discussed further with respect to the communication environment and hardware of an IoT processing device depicted in FIGS. 7 and 8.

Finally, clusters of IoT devices may be equipped to communicate with other IoT devices as well as with a cloud network. This may allow the IoT devices to form an ad-hoc network between the devices, allowing them to function as a single device, which may be termed a fog device, fog platform, or fog network. This configuration is discussed further with respect to FIG. 2 below.

FIG. 2 illustrates a cloud computing network in communication with a mesh network of IoT devices (devices 202) operating as a fog platform in a networked scenario. The mesh network of IoT devices may be termed a fog network 220, established from a network of devices operating at the edge of the cloud 200. To simplify the diagram, not every IoT device 202 is labeled.

The fog network 220 may be considered to be a massively interconnected network wherein a number of IoT devices 202 are in communications with each other, for example, by radio links 222. The fog network 220 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another As an example, the fog network 220 may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 202 are shown in this example, gateways 204, data aggregators 226, and sensors 228, although any combinations of IoT devices 202 and functionality may be used. The gateways 204 may be edge devices that provide communications between the cloud 200 and the fog network 220, and may also provide the backend process function for data obtained from sensors 228, such as motion data, flow data, temperature data, and the like. The data aggregators 226 may collect data from any number of the sensors 228, and perform the back end processing function for the analysis. The results, raw data, or both may be passed along to the cloud 200 through the gateways 204. The sensors 228 may be full IoT devices 202, for example, capable of both collecting data and processing the data. In some cases, the sensors 228 may be more limited in functionality, for example, collecting the data and allowing the data aggregators 226 or gateways 204 to process the data.

Communications from any IoT device 202 may be passed along a convenient path (e.g., a most convenient path) between any of the IoT devices 202 to reach the gateways 204. In these networks, the number of interconnections provide substantial redundancy, allowing communications to be maintained, even with the loss of a number of IoT devices 202. Further, the use of a mesh network may allow IoT devices 202 that are very low power or located at a distance from infrastructure to be used, as the range to connect to another IoT device 202 may be much less than the range to connect to the gateways 204.

The fog network 220 provided from these IoT devices 202 may be presented to devices in the cloud 200, such as a server 206, as a single device located at the edge of the cloud 200, e.g., a fog network operating as a device or platform. In this example, the alerts coming from the fog platform may be sent without being identified as coming from a specific IoT device 202 within the fog network 220. In this fashion, the fog network 220 may be considered a distributed platform that provides computing and storage resources to perform processing or data-intensive tasks such as data analytics, data aggregation, and machine-learning, among others.

In some examples, the IoT devices 202 may be configured using an imperative programming style, e.g., with each IoT device 202 having a specific function and communication partners. However, the IoT devices 202 forming the fog platform may be configured in a declarative programming style, allowing the IoT devices 202 to reconfigure their operations and communications, such as to determine needed resources in response to conditions, queries, and device failures. As an example, a query from a user located at a server 206 about the operations of a subset of equipment monitored by the IoT devices 202 may result in the fog network 220 selecting the IoT devices 202, such as particular sensors 228, needed to answer the query. The data from these sensors 228 may then be aggregated and analyzed by any combination of the sensors 228, data aggregators 226, or gateways 204, before being sent on by the fog network 220 device to the server 206 to answer the query. In this example, IoT devices 202 in the fog network 220 may select the sensors 228 used based on the query, such as adding data from flow sensors or temperature sensors. Further, if some of the IoT devices 202 are not operational, other IoT devices 202 in the fog network 220 may provide analogous data, if available.

The techniques discussed herein may be applicable to these and other network configurations. In an example, an internal versus external data model abstraction is established for use in IoT device frameworks and networks, to improve the context and security of data values provided from such devices and networks. For example, a separate internal representation and an external data model representation (e.g., an abstraction) may be utilized to prevent public disclosure of a device identifier or other sensitive information that may lead to device or user tracking by unauthorized parties. Separating the data model representations may also be used to improve safety, such as where an external update of a value may involve performance of several other (internal or external) operations before an internal update is applied, that may have a safety-critical impact.

Existing approaches have not applied data model abstractions in IoT networks, and comparable data management approaches are not applicable to IoT network configurations. For example, "views" used in a relational database management system (RDBMS) allow a presentation of data that differs from the perspective described by the database schema. A database view also has a schema that describes it, but the data provided by a view is from the same data described by the base schema. Thus, database views are unable to provide an internal versus external representation for an IoT network setting.

In a similar fashion, although the OCF specification defines limited interfaces for IoT device networks, such interfaces are only revealed for properties and attributes that are read-only. Some interfaces may relate to properties that are updatable, but these properties only pertain to the device manageability aspect rather than the device's sensing aspect (or any other aspect of producing internal data). Thus, without access to the full internal data, a client may use a separate a management interface in order to fully obtain and update data values.

As discussed herein, the use of separate data models for external versus internal use allows private data to be provided publicly within an IoT network, yet still allowing such data to be controlled in a contextual manner. This offers security and operational benefits for IoT networks having a mix of trusted and untrusted devices. Accordingly, the following techniques are directed to an approach for handling internal data values versus externally visible data values in the context of an IoT network data model. Further, with the techniques discussed herein, an internal data model and an external data model are separated from one another, while allowing data permutations and state changes of the device to qualify some aspect of the internal model that is made visible to the external model.

Figure 3:
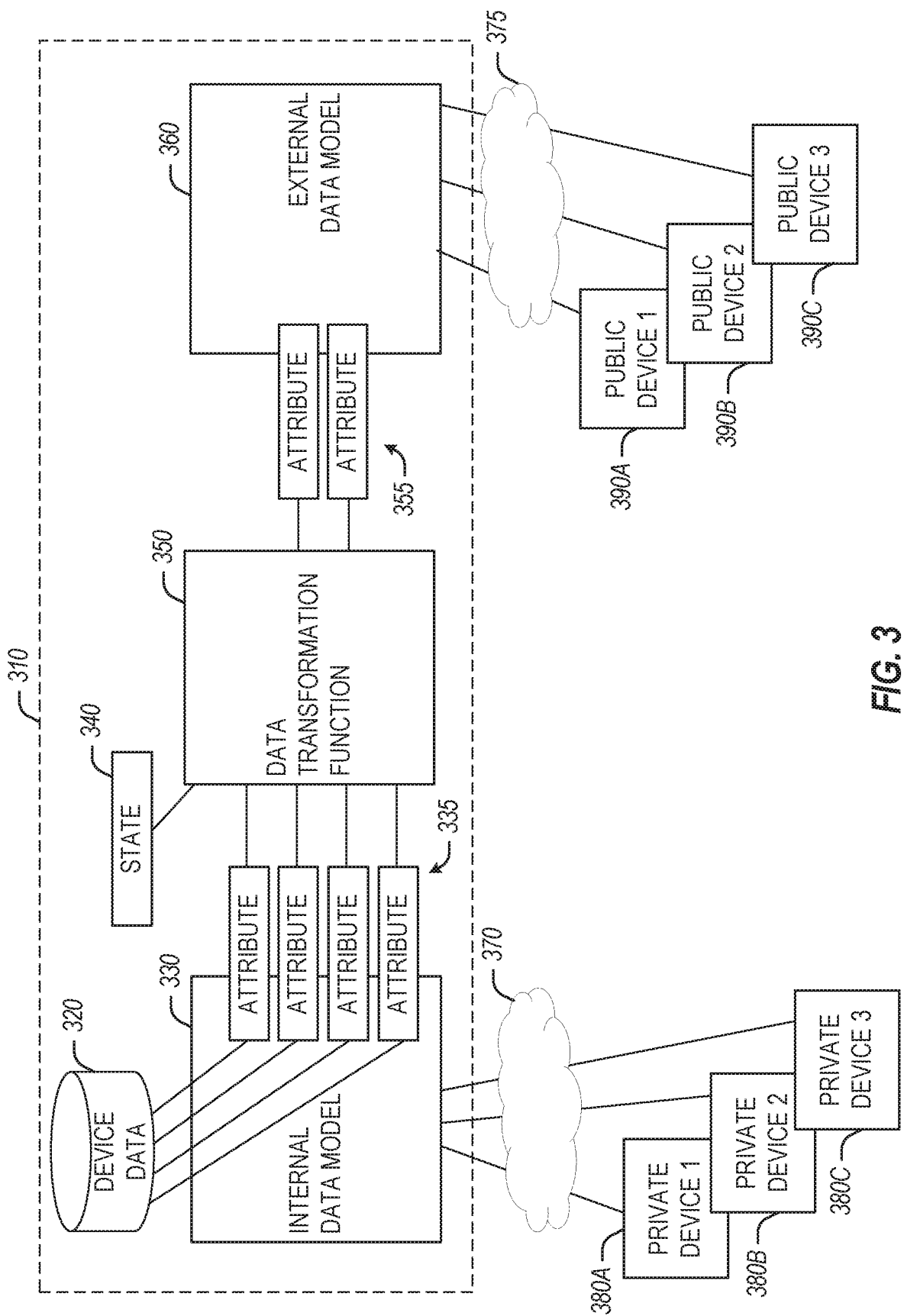
FIG. 3 illustrates a block diagram of an internal data model and an external data model operating among IoT devices, according to an example.

FIG. 3 illustrates a block diagram of an internal data model 330 and an external data model 360 operating among IoT devices 380, 390, according to an example network configuration 310. As illustrated in FIG. 3, the first data model (the internal data model 330) includes a number of attributes 335 obtained from a device data set 320; the second data model (the external data model 360) includes a smaller number of attributes 355, with the values of these attributes 355 being determined from a data transformation function 350 (e.g., a hash, permutation, or modification function) applied to at least one of the attributes 335 of the internal model 330. The data transformation function 350, in turn, may change the particular values of these attributes 335 based on a device state (e.g., state 340), other device data (e.g., from device data set 320), or other values, as the resulting attributes 355 are made accessible from the external data model 360.

For example, a first (internal) data schema may have ten attributes associated with an IoT device (e.g., from device 380A, 380B, or 380C, accessible via a first network 370), whereas a second (external) data schema may have eight or nine attributes. Also, the data values and data "view" available externally (e.g., as visible by device 390A, 390B, or 390C, accessible via a second network 375) may be modified from some sort of permutation where values are aggregated or changed. For instance, the first five values of the first data schema may be aggregated together to produce one value of the second data schema. Additionally, the external data model 360 may be customized to represent the internal data values differently, at different times. In another example, the second data schema includes the same number of attributes as the first data schema, but the values of these attributes may be controlled or modified via the permutation function.

In a further example, the data transformation function 350 may serve as a safety assurance mechanism where an external data model 360 may allow updates of a first external data model attribute, but restrict updates of a corresponding internal data model attribute. Safety critical functions may be linked to the internal attribute, but are not triggered as a result of an update to its corresponding external attribute until other conditions may be validated. For example, a data transformation function 350 may further require a second internal attribute be a certain value before the first internal attribute may be updated. Or further, a second external attribute may be required to be a certain value before a first internal value may be updated by the first external value.

More complex dependency interactions may be possible.

Also in a further example, the permutations may use a secure channel to obtain an identifier that may not exist in the external data model 360 to hide information that exists in the internal data model 330. For example, the resources that apply to a different device are hidden from the first device when accessing resources of a second device. For instance, data that is associated with a particular device (or tenant) cannot be queried by anyone other than the currently connected device. The resource abstraction or view therefore shows only the instance of resources (e.g., attributes 355) that is intended for view by the authenticated caller (e.g., public device 390A-C).

Figure 4:
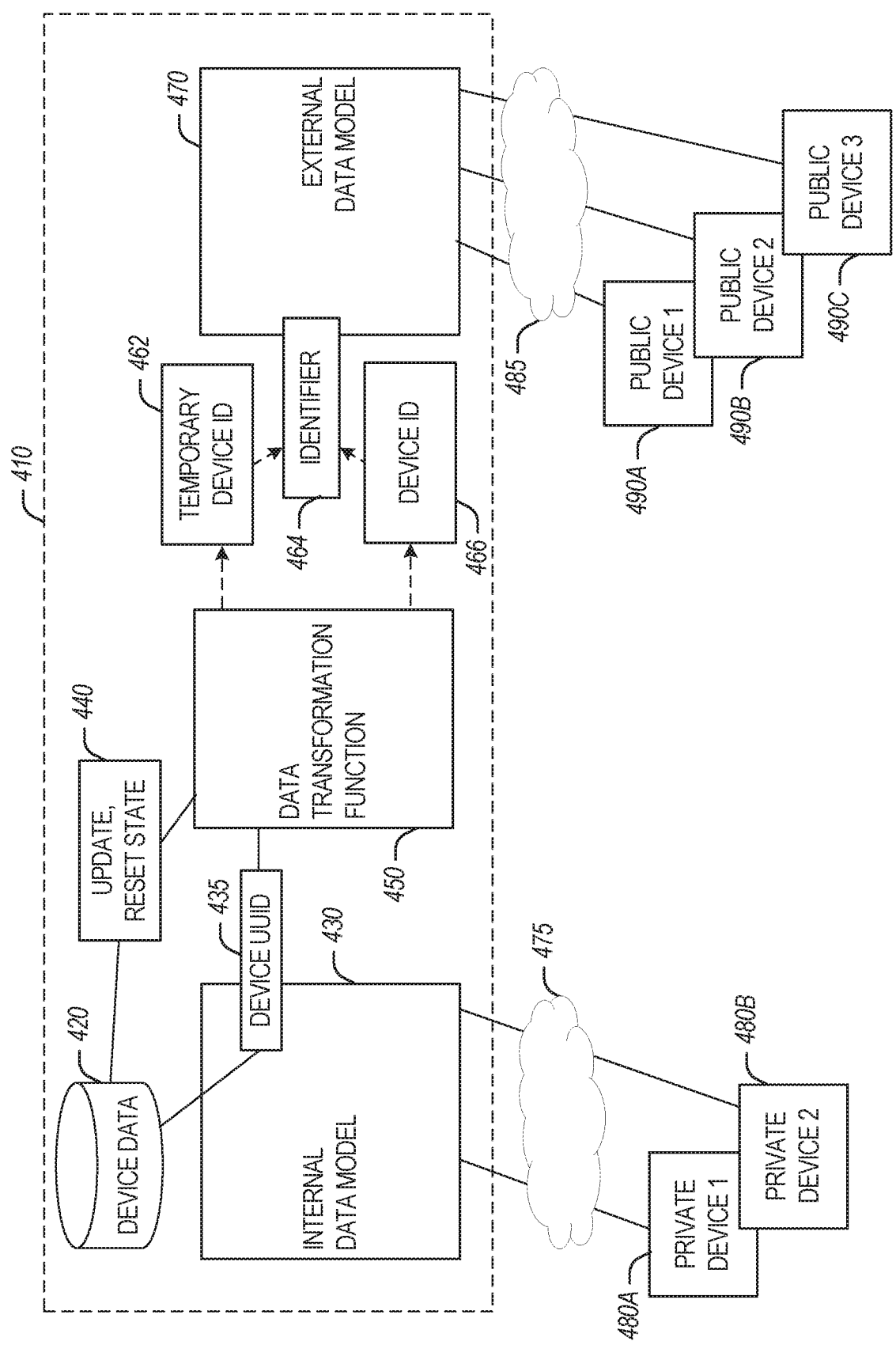
FIG. 4 illustrates a block diagram of an internal data model and an external data model, operating to provide an identifier value among IoT devices, according to an example.

FIG. 4 illustrates a block diagram of an example internal data model 430 and an example external data model 470, operating to provide an identifier value 464 among IoT devices 480, 490, according to an example network configuration 410. As shown, the internal data model 430 is simplified to show the use of an internal data value (a device UUID 435, obtained from a device data set 420) provided to a data transformation function 450. The external data model 470 is also simplified to show the use of an external data value (an identifier 464).

In an example, a device identifier 464 may be "revealed" from the external data model 470 where the permutation applied has to do with the state of the device (e.g., the update/reset state 440), and the state of at least one of the properties that changes (such as changing a device property as a result of interaction with an on-boarding utility). Based on the result of the permutation function, which changes based on the update or reset state of the device (update/reset state 440), the exposed identifier 464 from the external data model 470 may provide a temporary device identifier value 462 (e.g., when the device is in a reset or update state) or an actual device identifier value 466 (e.g., when the device is in an operational state). The actual device identifier value 466 may be the same as device UUID 435. Alternatively, the data transformation function 450 may act on the device UUID 435 and produce a different value for use as the device ID 466. Similarly, the data transformation function 450 may act on the device UUID 435 to produce the temporary device identifier 462. The data transformation function 450 may be a cryptographic hash that is pre-image resistant, second pre-image resistant, and collision resistant. Using a cryptographic hash function with these types of properties provides high reliability that the device UUID 435 is kept secret from public devices 490.

A device may have several states including, but not limited to a reset state, an update state, and an operational state. In a reset state, certain device attributes, parameters, or properties may be set to a NULL value, a zero value, an empty string, or otherwise set to a value that indicates that the device is not owned, being used, or otherwise provisioned for use. In an update state, certain device attributes, parameters, or properties may be set to a value that indicates that the device is being updated, provisioned, onboarded, or otherwise being prepared for use. In an operational state, certain device attributes, parameters, or properties may be set to a have valid values that indicate that the device is owned by a certain resource, is being used, or is otherwise ready for use.

Hiding the device unique identifier 435 in this fashion may be used to achieve a privacy or security benefit. The device data 420 (and values such as the device UUID 435) remains visible or accessible to private devices 480A, 480B accessed via a private network 475; whereas the identifier 464, which is exposed to public devices 490A, 490B, 490C, is tied to the results of the data transformation function 450. A detailed explanation of how an external data model 470 is deployed for visibility of identifiers with use in an IoT device network operating according to an OCF specification or configuration is discussed further below.

While FIG. 4 is an illustrated example of internal and external data model use, other usages are within the scope of this disclosure. Thus, in a further example, internal and external data models may be utilized with transaction resources, such as transaction resources deployed in an IoT device network operating according to an OCF specification or configuration. Transaction resources in an IoT network may be described in terms of an internal data model and an external data model, and various permutations or state changes that qualify a change in either the internal or the external data models. In the case of transaction resources, the direction of change is essentially reversed from the examples above, because a change to the external data model does not immediately translate to a change in the internal data model. Instead, transaction resources utilize a set of permutations and state changes that occur first to the external data model followed by a change to the internal data model. Restated, a change to the external data model may be "committed" to the internal data model through transaction resources.

Also in a further example, internal and external data models may incorporate a blockchain transaction to capture, respectively, changes to either the internal or external data models following some appropriate permutation or state change. For example, a change to the internal data model may prompt an update to a blockchain while changes to an external data model do not. Additionally, a different blockchain may be used for logging transaction activity involving an external data model versus an internal data model, such as in a scenario where a public blockchain logs interactions of the external data model and a private blockchain logs activity to the internal data model.

The following excerpt provides a specific example of how external versus internal values of a device identifier may be exposed with the present techniques, through implementation in network operating according to an OCF specification.

In an OCF network example, the Server may expose a persistent or semi-persistent device identifier through the 'deviceuuid' Property of the /doxm Resource in response to successful UPDATE of the 'devowneruuid' Property of the/doxm Resource to a non-nil-UUID value.

Owner transfer method interactions should communicate the deviceuuid value to the DOTS/DOXS (Device Owner Transfer Service) service that is taking ownership. The Server should associate the deviceuuid with the owner credential in secured storage.

The device vendor shall determine that the device identifier (deviceuuid) reflects a persistent (not updatable via an OCF interface) or a semi-persistent (updatable by the owner transfer service—a.k.a DOTA via an OCF interface) value.

If deviceuuid Property is persistent, the request to UPDATE shall fail with the error PROPERTY_NOT_FOUND. If deviceuuid Property is semi-persistent, the request to UPDATE shall succeed and the value supplied by DOTS shall be remembered until the device is RESET. If the UPDATE to deviceuuid Property fails the device state shall transition to RESET where the Server shall set the value of deviceuuid to the nil-UUID (e.g. "00000000-0000-0000-0000-000000000000").

Regardless of whether the device has a persistent or semi-persistent deviceuuid, a temporary non-repeated-UUID is exposed by the Server each time the device enters RESET. The temporary non-repeated 'deviceuuid' replaces the current (e.g. previous temporary, persistent or semi-persistent) value of 'deviceuuid' when the device state transitions to the RESET state and remains until the DOXS service establishes a secure OTM connection and UPDATES the 'devowneruuid' Property to a non-nil-UUID value.

In this OCF network example, unique identifiers are a privacy consideration due to their potential for being used as a tracking mechanism. All identifiers are unique values that are visible to throughout the device lifecycle by anonymous requestors. This implies any client device, including those with malicious intent, are able to reliably obtain identifiers useful for building a log of activity correlated with a specific platform and device.

There are two strategies for privacy protection of devices: 1) apply an ACL policy that restricts read access to resources containing unique identifiers; and 2) limit identifier persistence to make it impractical for tracking use. Both techniques may be used effectively together to limit exposure to privacy attacks.

In this OCF network example. Servers shall expose a temporary, non-repeated device identifier through the 'deviceuuid' Property of the/doxm Resource when the device transitions to RESET state. The temporary identifiers are disjoint from and not correlated to the persistent and semi-persistent identifiers. Temporary, non-repeated identifiers shall be: (a) disjoint from (i.e. not linked to) the persistent or semi-persistent identifiers; and (b) generated by a function that is pre-image resistant, second pre-image resistant and collision resistant.

A new device seeking deployment needs to inform would-be onboarding tools (OBTs) of the identifier used to begin the onboarding process. However, attackers could obtain the value too and use it for device tracking throughout the device's lifetime. To address this privacy threat, Servers shall expose a temporary non-repeated identifier through the 'deviceuuid' property of the /doxm resource to unauthenticated /res and /doxm requests when the 'devowneruuid' is the nil-UUID. The server shall expose a new temporary non-repeated 'deviceuuid' property of the /doxm resource when the device state transitions to RESET. This ensures the 'deviceuuid' value cannot be used to track across multiple owners.

The 'devowneruuid' property is initialized to the nil-UUID upon entering RESET; which is retained until being set to a non-nil-UUID value during RFOTM device state.

The device shall supply a temporary, non-repeated 'device-uuid' to RETRIEVE requests on /doxm and /res resources while 'devowneruuid' is the nil-UUID. The onboarding utility shall update the 'devowneruuid' to a non-nil UUID value that triggers the server to allow the persistent or semi-persistent 'deviceuuid' to be returned in RETRIEVE requests to the /doxm and /res resources.

Servers may expose a temporary, non-repeated, 'piid' property value upon entering RESET state. Servers may expose a persistent value through the 'piid' property when onboarding sets 'devowneruuid' to a non-nil-UUID value. An ACL policy on the /d resource should protect the 'piid' from being disclosed to anonymous requestors. Servers may expose a temporary, non-repeated, 'pi' property value upon entering RESET state. Servers may expose a persistent or semi-persistent value through the 'pi' property when onboarding sets 'devowneruuid' to a non-nil-UUID value. An ACL policy on the /p resource should protect the 'pi' property from being disclosed to anonymous requestors.

The following table illustrates core resource properties access modes based on various device states.

TABLE 1

| Resource type | Property title | Property name | Value type | Behavior |
|---|---|---|---|---|
| oic.wk.p | Platform ID | pi | oic.types-schema.uuid | Server shall construct a temporary non-repeated UUID when entering RESET state and replace it with a persistent value during RFOTM state. (Note: the temporary value does not clobber the persistent pi internally) |
| oic.wk.p | Protocol Independent Identifier | piid | oic.types-schema.uuid | Server should construct a temporary non-repeated UUID when entering RESET state and replace it with a persistent value during RFOTM state. (Note: the temporary value does not clobber the persistent piid internally). |
| oic.wk.d | Device Identifier | di | oic.types-schema.uuid | /d di shall mirror the value contained in /doxm deviceuuid in all device states. |

Figure 5:
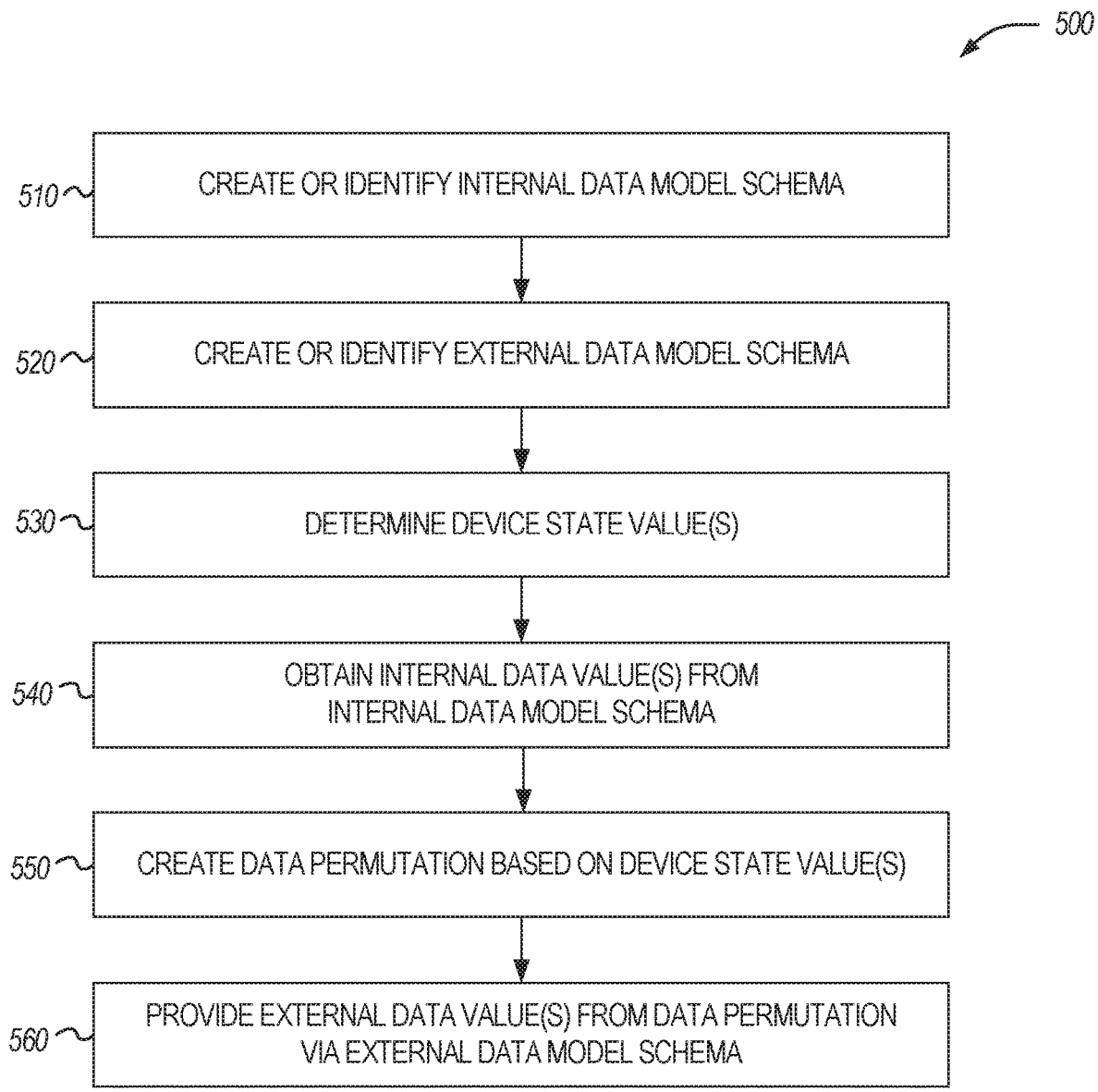
FIG. 5 illustrates a flowchart of a technique for establishing and operating an internal data model and an external data model with use of a data transformation function, according to an example.

FIG. 5 illustrates a flowchart 500 of an example technique for establishing and operating an internal data model and an external data model with use of a data transformation (a permutation or other modification) function. As shown, the operations of the flowchart 500 are depicted as sequential; in other examples, the operations of the flowchart 500 may be performed in another order or with additional (or fewer) operations. Variations to the operations may occur in scenarios involving other devices or entities on an IoT deployment network than those illustrated.

As shown, the operations of the flowchart 500 include the creation or identification of an internal data model schema (operation 510) and the creation or identification of an external data model schema (operation 520). In an example, the internal data model schema corresponds to a larger number of data attributes regarding a device (e.g., to be visible to other trusted device), and the external data model schema corresponds to a smaller or restricted number of data attributes regarding the device (e.g., to be publicly visible to untrusted devices).

The operations of the flowchart 500 continue with the determination of one or more device state values (operation 530), which are provided for use in a data permutation function. The operations continue with the determination or access to one or more internal data values from an internal data model schema (operation 540) to be used in a data permutation function. A data permutation function operates to create the data permutation (operation 550), based on the device state values or other attributes or characteristics of the device. Finally, a set of one or more external data values, produced from the data permutation, are provided via the external data model schema (operation 560). Additional configuration or adaptation to the operations above may be automated or enhanced based on network or security configurations, or other attributes or functions applied within a device or networked device configuration.

Figure 6:
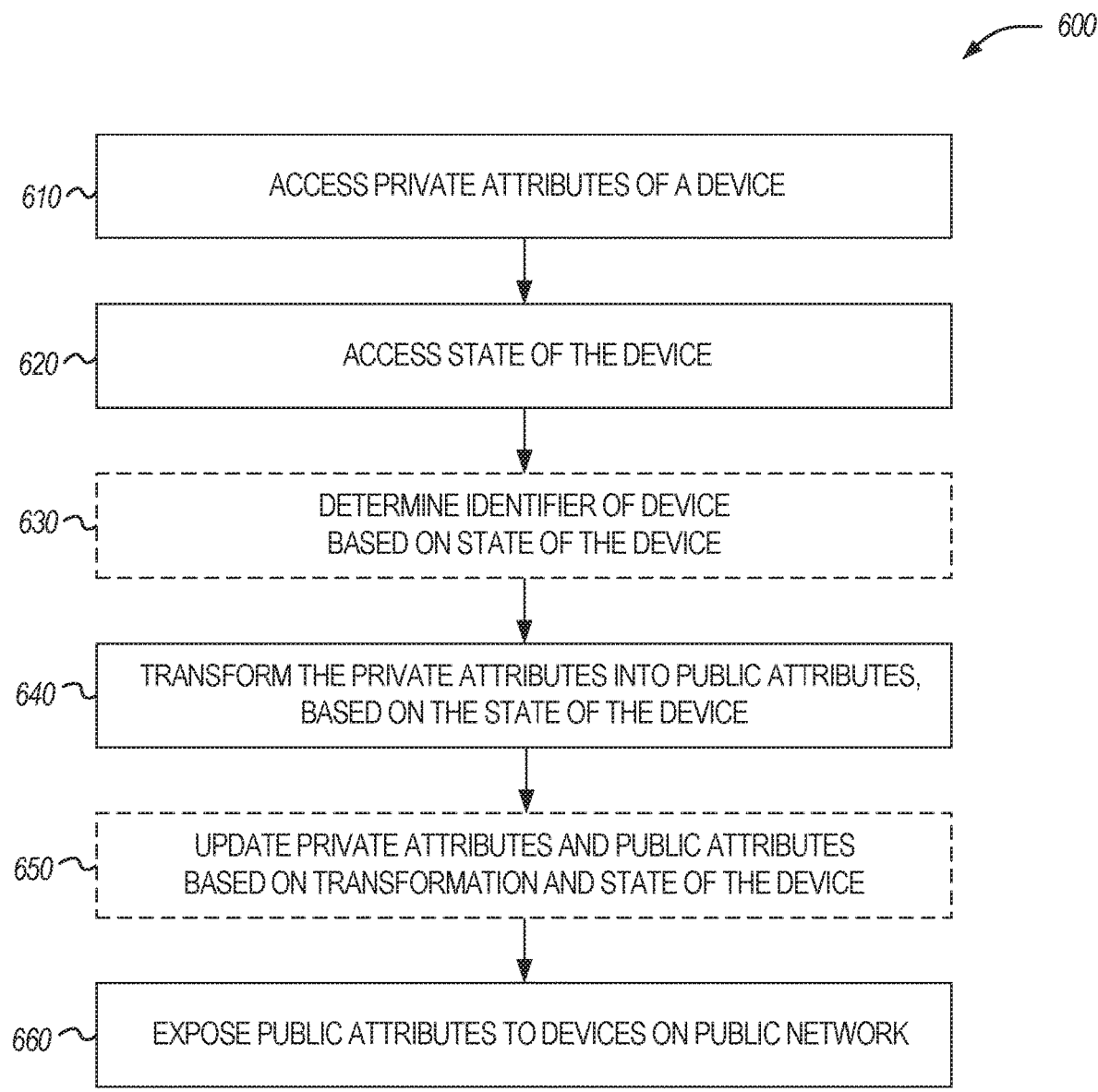
FIG. 6 illustrates a flowchart of a technique for performing data transformation of device attributes, for access in private and public settings, according to an example.

FIG. 6 illustrates a flowchart 600 of an example technique for performing data transformation of device attributes, for access in private and public settings. As shown, the operations of the flowchart 600 are depicted as sequential; in other examples, the operations of the flowchart 600 may be performed in another order or with additional (or fewer) operations. Further, the flowchart 600 is depicted from the perspective of operations performed at a data transformation service or like data processing device, adapted to coordinate requests and data between private and public settings of a network. It will be understood that variations to the operations may occur in scenarios that do not include fully separated private and public networks, and in scenarios where other types of data is exposed and utilized.

The operations of the flowchart 600 commence with the access of a set of private attributes associated with a networked device, in operation 610, and access the state of the networked device, in operation 620. In an example, this set of private attributes is visible to other devices on a private network. In a further example, the set of private attributes is selected from a device data store. Also in a further example, the set of private attributes is organized as an internal data model. The state of the networked device may include a reset state, update state, or operational state.

The operations of the flowchart 600 continue optionally with the determination of an identifier of the networked device, based on the state of the device, in operation 630. In an example, this includes access of a device unique identifier value from the set of private attributes, with the device unique identifier value used to uniquely identify the networked device.

The operations of the flowchart 600 continue with the transformation of the private attributes into public attributes, in operation 640, using a transformation function, based on the state of the device. In an example, the public attributes are made visible to devices on a public network, and the transformation function is altered by the state of the networked device. In a further example, the transformation function includes, when the state of the networked device is one of a reset state or an update state, apply a transformation cryptographic hash function to the device unique identifier value to produce a temporary device identifier; or, when the state of the network device is an operational state: copy the device unique identifier value to a visible device identifier, and establish the set of public attributes to include the visible device identifier. Also in further examples, the transformation of the set of private attributes to the set of public attributes is provided from operations that: access a plurality of values from the set of private attributes; apply the transformation function to combine the plurality of values to produce a combined value; and establish the set of public attributes to include the combined value.

The operations of the flowchart 600 continue optionally with an update of private attributes and public attributes based on the transformation and the state of the device, in operation 650. For example, this may include access of a first attribute value from the set of public attributes, and the update of an attribute of the set of private attributes when the first attribute value from the set of public attributes is a predetermined value. As a further example, the update to the attribute of the set of private attributes also includes an update to the attribute based on a second attribute value from the set of public attributes.

The operations of the flowchart 600 conclude to expose, provide, or otherwise offer the set of public attributes to the devices on the public network, in operation 660. Other variations to the source, value, and limitations of these public attributes may also be provided.

In an example, the operations and functionality described above with reference to FIGS. 3 to 6 may be embodied by an IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a computer) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 7:
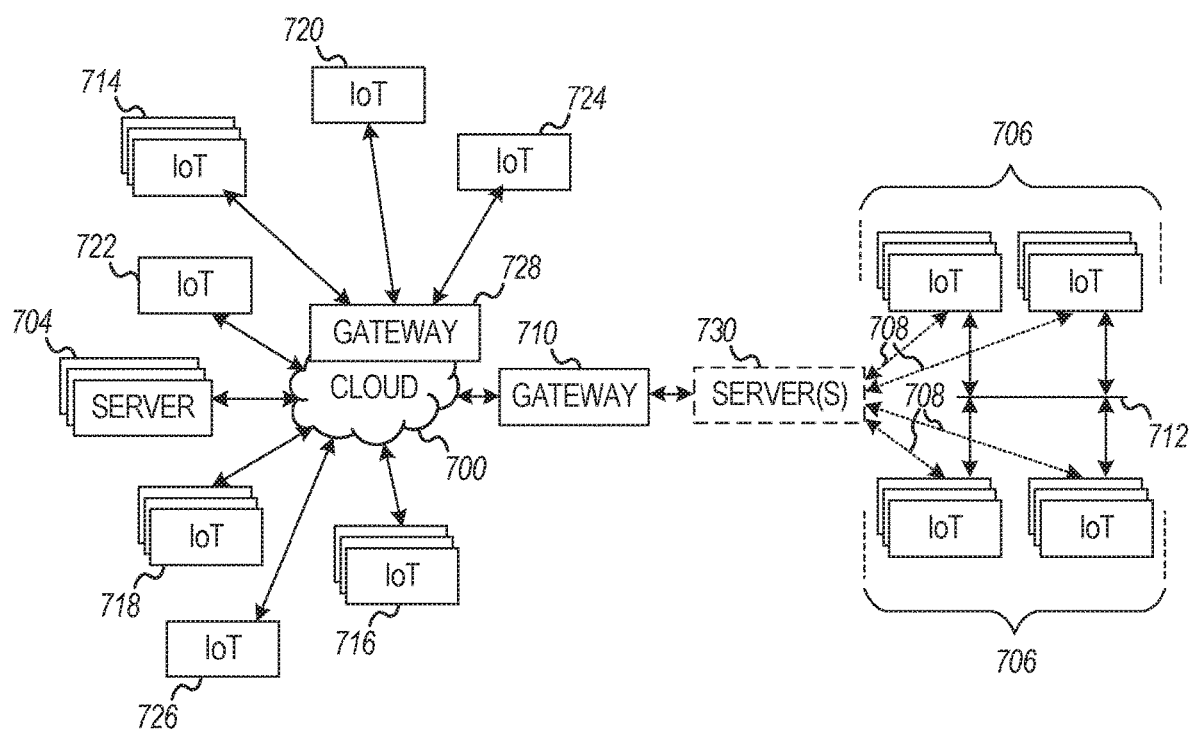
FIG. 7 illustrates a block diagram of a network illustrating communications among a number of IoT devices, according to an example.

FIG. 7 illustrates a drawing of a cloud computing network, or cloud 700, in communication with a number of Internet of Things (IoT) devices. The cloud 700 may represent the Internet. or may be a local area network (LAN), or a wide area network (WAN), such as a proprietary network for a company. The IoT devices may include any number of different types of devices, grouped in various combinations. For example, a traffic control group 706 may include IoT devices along streets in a city. These IoT devices may include stoplights, traffic flow monitors, cameras, weather sensors, and the like. The traffic control group 706, or other subgroups, may be in communication with the cloud 700 through wired or wireless links 708, such as LPWA links, optical links, and the like. Further, a wired or wireless sub-network 712 may allow the IoT devices to communicate with each other, such as through a local area network, a wireless local area network, and the like. The IoT devices may use another device, such as a gateway 710 or 728 to communicate with remote locations such as the cloud 700; the IoT devices may also use one or more servers 730 to facilitate communication with the cloud 700 or with the gateway 710. For example, the one or more servers 730 may operate as an intermediate network node to support a local edge cloud or fog implementation among a local area network. Further, the gateway 728 that is depicted may operate in a cloud-to-gateway-to-many edge devices configuration, such as with the various IoT devices 714, 720, 724 being constrained or dynamic to an assignment and use of resources in the cloud 700.

Other example groups of IoT devices may include remote weather stations 714, local information terminals 716, alarm systems 718, automated teller machines 720, alarm panels 722, or moving vehicles, such as emergency vehicles 724 or other vehicles 726, among many others. Each of these IoT devices may be in communication with other IoT devices, with servers 704, with another IoT fog platform or system (not shown, but depicted in FIG. 2), or a combination therein. The groups of IoT devices may be deployed in various residential, commercial, and industrial settings (including in both private or public environments).

As may be seen from FIG. 7, a large number of IoT devices may be communicating through the cloud 700. This may allow different IoT devices to request or provide information to other devices autonomously. For example, a group of IoT devices (e.g., the traffic control group 706) may request a current weather forecast from a group of remote weather stations 714, which may provide the forecast without human intervention. Further, an emergency vehicle 724 may be alerted by an automated teller machine 720 that a burglary is in progress. As the emergency vehicle 724 proceeds towards the automated teller machine 720, it may access the traffic control group 706 to request clearance to the location, for example, by lights turning red to block cross traffic at an intersection in sufficient time for the emergency vehicle 724 to have unimpeded access to the intersection.

Clusters of IoT devices, such as the remote weather stations 714 or the traffic control group 706, may be equipped to communicate with other IoT devices as well as with the cloud 700. This may allow the IoT devices to form an ad-hoc network between the devices, allowing them to function as a single device, which may be termed a fog platform or system (e.g., as described above with reference to FIG. 2).

Figure 8:
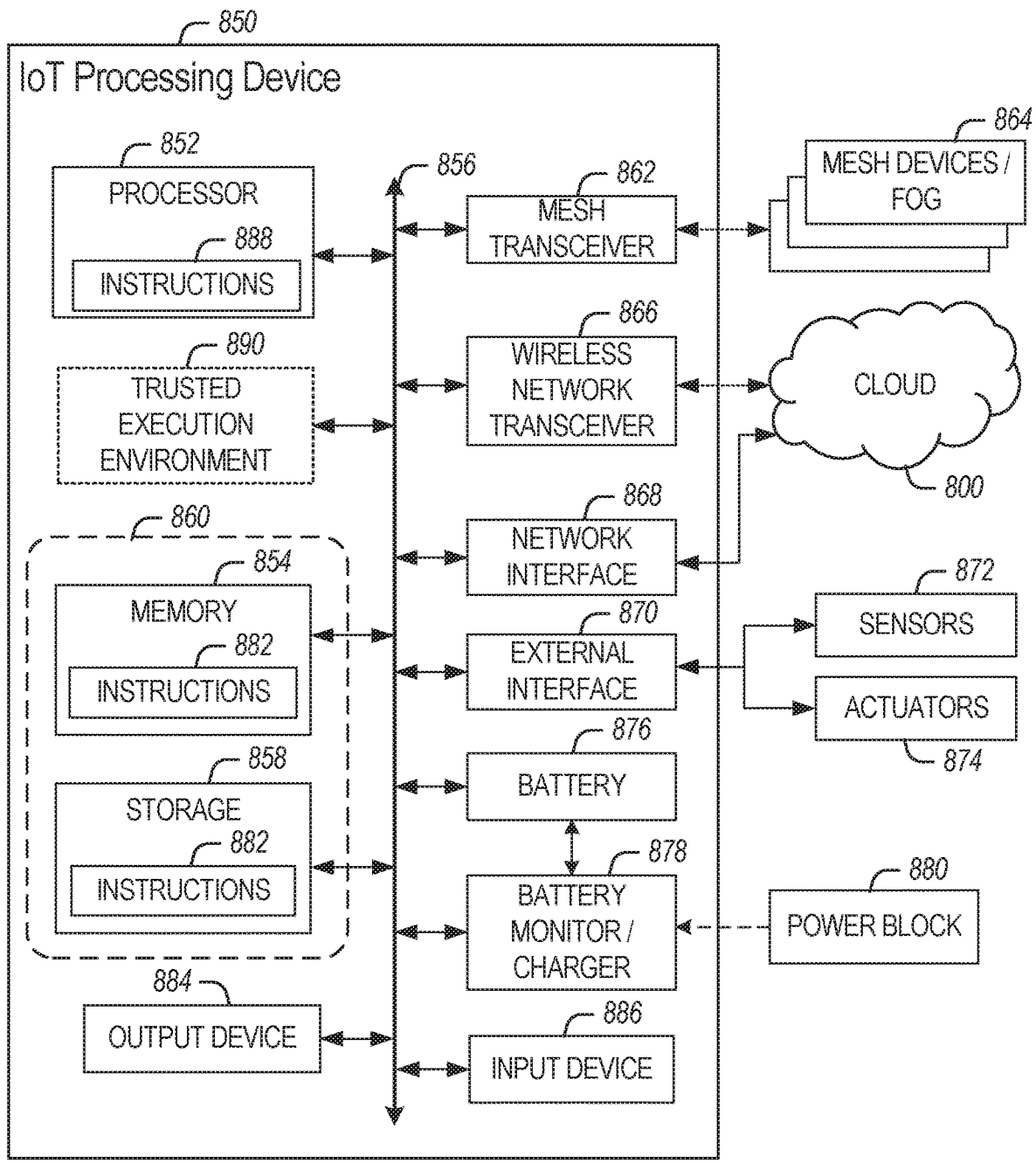
FIG. 8 illustrates a block diagram for an example IoT processing system architecture upon which any one or more of the techniques (e.g., operations, processes, methods, and methodologies) discussed herein may be performed.

FIG. 8 is a block diagram of an example of components that may be present in an IoT device 850 for implementing the techniques described herein. The IoT device 850 may include any combinations of the components shown in the example or referenced in the disclosure above. The components may be implemented as ICs, portions thereof, discrete electronic devices, or other modules, logic, hardware, software, firmware, or a combination thereof adapted in the IoT device 850, or as components otherwise incorporated within a chassis of a larger system. Additionally, the block diagram of FIG. 8 is intended to depict a high-level view of components of the IoT device 850. However, some of the components shown may be omitted, additional components may be present, and different arrangement of the components shown may occur in other implementations.

The IoT device 850 may include processing circuitry in the form of a processor 852, which may be a microprocessor, a multi-core processor, a multithreaded processor, an ultra-low voltage processor, an embedded processor, or other known processing elements. The processor 852 may be a part of a system on a chip (SoC) in which the processor 852 and other components are formed into a single integrated circuit, or a single package, such as the Edison™ or Galileo™ SoC boards from Intel. As an example, the processor 852 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices. Inc. (AMD) of Sunnyvale, Calif. a MIPS-based design from MIPS Technologies, Inc. of Sunnyvale, Calif., an ARM-based design licensed from ARM Holdings. Ltd. or customer thereof, or their licensees or adopters. The processors may include units such as an A5-A7 processor from Apple® Inc., a Snapdragon™ processor from Qualcomm® Technologies. Inc., or an OMAP™ processor from Texas Instruments. Inc.

The processor 852 may communicate with a system memory 854 over an interconnect 856 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 858 may also couple to the processor 852 via the interconnect 856. In an example the storage 858 may be implemented via a solid state disk drive (SSDD). Other devices that may be used for the storage 858 include flash memory cards, such as SD cards, microSD cards, xD picture cards, and the like, and USB flash drives. In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in a SoC based system. Other bus systems may be included, such as an I2C interface, an SPI interface, point to point interfaces, and a power bus, among others.

The interconnect 856 may couple the processor 852 to a mesh transceiver 862, for communications with other mesh devices 864. The mesh transceiver 862 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 864. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 862 may communicate using multiple standards or radios for communications at different range. For example, the IoT device 850 may communicate with close devices, e.g., within about 10 meters, using a local transceiver based on BLE, or another low power radio, to save power. More distant mesh devices 864, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 866 may be included to communicate with devices or services in the cloud 800 via local or wide area network protocols. The wireless network transceiver 866 may be a LPWA transceiver that follows the IEEE 802.15.4, or IEEE 802.15.4g standards, among others. The IoT device 850 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 862 and wireless network transceiver 866, as described herein. For example, the radio transceivers 862 and 866 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 862 and 866 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 866, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 868 may be included to provide a wired communication to the cloud 800 or to other devices, such as the mesh devices 864. The wired communication may provide an Ethernet connection, or may be based on other types of networks, such as Controller Area Network (CAN). Local Interconnect Network (LIN), DeviceNet, ControlNet, Data Highway+, PROFIBUS, or PROFINET, among many others. An additional NIC 868 may be included to allow connect to a second network, for example, a NIC 868 providing communications to the cloud over Ethernet, and a second NIC 868 providing communications to other devices over another type of network.

Given the variety of types of applicable communications from the device to another component or network, applicable communications circuitry used by the device may include or be embodied by any one or more of components 862, 866, 868, or 870. Accordingly, in various examples, applicable means for communicating (e.g., receiving, transmitting, etc.) may be embodied by such communications circuitry.

The interconnect 856 may couple the processor 852 to an external interface 870 that is used to connect external devices or subsystems. The external devices may include sensors 872, such as accelerometers, level sensors, flow sensors, optical light sensors, camera sensors, temperature sensors, a global positioning system (GPS) sensors, pressure sensors, barometric pressure sensors, and the like. The external interface 870 further may be used to connect the IoT device 850 to actuators 874, such as power switches, valve actuators, an audible sound generator, a visual warning device, and the like.

In some optional examples, various input/output (I/O) devices may be present within, or connected to, the IoT device 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 850.

A battery 876 may power the IoT device 850, although in examples in which the IoT device 850 is mounted in a fixed location, it may have a power supply coupled to an electrical grid. The battery 876 may be a lithium ion battery, or a metal-air battery, such as a zinc-air battery, an aluminum-air battery, a lithium-air battery, and the like.

A battery monitor/charger 878 may be included in the IoT device 850 to track the state of charge (SoCh) of the battery 876. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LTC2990 from Linear Technologies, an ADT7488A from ON Semiconductor of Phoenix Ariz. or an IC from the UCD90xxx family from Texas Instruments of Dallas, Tex. The battery monitor/charger 878 may communicate the information on the battery 876 to the processor 852 over the interconnect 856. The battery monitor/charger 878 may also include an analog-to-digital (ADC) convertor that allows the processor 852 to directly monitor the voltage of the battery 876 or the current flow from the battery 876. The battery parameters may be used to determine actions that the IoT device 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the IoT device 850. A wireless battery charging circuit, such as an LTC4020 chip from Linear Technologies of Milpitas, Calif., among others, may be included in the battery monitor/charger 878. The specific charging circuits chosen depend on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine readable medium 860 including code to direct the processor 852 to perform electronic operations in the IoT device 850. The processor 852 may access the non-transitory, machine readable medium 860 over the interconnect 856. For instance, the non-transitory, machine readable medium 860 may be embodied by devices described for the storage 858 of FIG. 8 or may include specific storage units such as optical disks, flash drives, or any number of other hardware devices. The non-transitory, machine readable medium 860 may include instructions to direct the processor 852 to perform a specific sequence or flow of actions, for example, as described with respect to the flowchart(s) and block diagram(s) of operations and functionality depicted above.

In still a specific example, the instructions 888 on the processor 852 (separately, or in combination with the instructions 888 of the machine readable medium 860) may configure execution or operation of a trusted execution environment (TEE) 890. In an example, the TEE 890 operates as a protected area accessible to the processor 852 for secure execution of instructions and secure access to data. Various implementations of the TEE 890, and an accompanying secure area in the processor 852 or the memory 854 may be provided, for instance, through use of Intel® Software Guard Extensions (SGX) or ARM® Trust-Zone® hardware security extensions. Intel® Management Engine (ME), or Intel® Converged Security Manageability Engine (CSME). Other aspects of security hardening, hardware roots-of-trust, and trusted or protected operations may be implemented in the device 850 through the TEE 890 and the processor 852.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is a device, comprising: communications circuitry; processing circuitry; and a memory device including instructions embodied thereon, wherein the instructions, which when executed by the processing circuitry, configure the processing circuitry to perform operations of a data transformation service to: access a set of private attributes associated with a networked device, the set of private attributes being visible to devices on a private network; access a state of the networked device; transform the set of private attributes to a set of public attributes using a transformation function, the set of public attributes visible to devices on a public network, the transformation function altered by the state of the networked device; and expose the set of public attributes to the devices on the public network.

In Example 2, the subject matter of Example 1 includes, the set of private attributes being selected from a device data store.

In Example 3, the subject matter of Examples 1-2 includes, the set of private attributes being organized as an internal data model.

In Example 4, the subject matter of Examples 1-3 includes, the state of the networked device including a reset state.

In Example 5, the subject matter of Examples 1-4 includes, the state of the networked device including an update state.

In Example 6, the subject matter of Examples 1-5 includes, the state of the networked device including an operational state.

In Example 7, the subject matter of Examples 1-6 includes, transformation of the set of private attributes to the set of public attributes being provided from operations that: access a device unique identifier value from the set of private attributes, the device unique identifier value used to uniquely identify the networked device; when the state of the networked device is one of a reset state or an update state: apply the transformation function to the device unique identifier value to produce a temporary device identifier, the transformation function being a cryptographic hash function; and set the set of public attributes to include the temporary device identifier.

In Example 8, the subject matter of Examples 1-7 includes, transformation of the set of private attributes to the set of public attributes being provided from operations that: access a device unique identifier value from the set of private attributes, the device unique identifier value used to uniquely identify the networked device; when the state of the networked device is an operational state: copy the device unique identifier value to a visible device identifier; and establish the set of public attributes to include the visible device identifier.

In Example 9, the subject matter of Examples 1-8 includes, transformation of the set of private attributes to the set of public attributes being provided from operations that: access a plurality of values from the set of private attributes; apply the transformation function to combine the plurality of values to produce a combined value; and establish the set of public attributes to include the combined value.

In Example 10, the subject matter of Examples 1-9 includes, the operations further to: access a first attribute value from the set of public attributes; and update an attribute of the set of private attributes when the first attribute value from the set of public attributes is a predetermined value.

In Example 11, the subject matter of Example 10 includes, the update to the attribute of the set of private attributes including an update to the attribute based on a second attribute value from the set of public attributes.

Example 12 is a method comprising: accessing a set of private attributes associated with a networked device, the set of private attributes being visible to devices on a private network; accessing a state of the networked device; transforming the set of private attributes to a set of public attributes using a transformation function, the set of public attributes visible to devices on a public network, the transformation function altered by the state of the networked device; and exposing the set of public attributes to the devices on the public network.

In Example 13, the subject matter of Example 12 includes, the set of private attributes being selected from a device data store.

In Example 14, the subject matter of Examples 12-13 includes, the set of private attributes being organized as an internal data model.

In Example 15, the subject matter of Examples 12-14 includes, the state of the networked device including a reset state.

In Example 16, the subject matter of Examples 12-15 includes, the state of the networked device including an update state.

In Example 17, the subject matter of Examples 12-16 includes, the state of the networked device including an operational state.

In Example 18, the subject matter of Examples 12-17 includes, transforming the set of private attributes to the set of public attributes comprises: accessing a device unique identifier value from the set of private attributes, the device unique identifier value used to uniquely identify the networked device; when the state of the networked device is one of a reset state or an update state: applying the transformation function to the device unique identifier value to produce a temporary device identifier, the transformation function being a cryptographic hash function; and setting the set of public attributes to include the temporary device identifier.

In Example 19, the subject matter of Examples 12-18 includes, transforming the set of private attributes to the set of public attributes comprises: accessing a device unique identifier value from the set of private attributes, the device unique identifier value used to uniquely identify the networked device; when the state of the networked device is an operational state: copying the device unique identifier value to a visible device identifier; and establishing the set of public attributes to include the visible device identifier.

In Example 20, the subject matter of Examples 12-19 includes, transforming the set of private attributes to the set of public attributes comprises: accessing a plurality of values from the set of private attributes; applying the transformation function to combine the plurality of values to produce a combined value; and establishing the set of public attributes to include the combined value.

In Example 21, the subject matter of Examples 12-20 includes, accessing a first attribute value from the set of public attributes; and updating an attribute of the set of private attributes when the first attribute value from the set of public attributes is a predetermined value.

In Example 22, the subject matter of Example 21 includes, updating the attribute of the set of private attributes comprises: updating the attribute of the set of private attributes based on a second attribute value from the set of public attributes.

Example 23 is a machine-readable storage medium including instructions, wherein the instructions, when executed by a processing circuitry of a device, cause the processing circuitry to perform operations of any of Examples 12 to 22.

Example 24 is a system, comprising: a client device, comprising communications circuitry and processing circuitry, the client device connected with a private network, and the client device associated with a set of private attributes being visible to devices on the private network; a data transformation device, comprising communications circuitry and processing circuitry, the data transformation device communicatively coupled to the client device via the private network, with the processing circuitry adapted to: access the set of private attributes associated with the client device; access a state of the client device; transform the set of private attributes to a set of public attributes using a transformation function, the set of public attributes visible to other devices on a public network, the transformation function altered by the state of the networked device; and expose the set of public attributes to the other devices on the public network.

Example 25 is an apparatus, comprising: means for accessing a set of private attributes associated with a networked device, the set of private attributes being visible to devices on a private network; means for accessing a state of the networked device; means for transforming the set of private attributes to a set of public attributes using a transformation function, the set of public attributes visible to devices on a public network, the transformation function altered by the state of the networked device; and means for exposing the set of public attributes to the devices on the public network.

In Example 26, the subject matter of Example 25 includes, means for selecting the set of private attributes from a device data store.

In Example 27, the subject matter of Examples 25-26 includes, means for organizing the set of private attributes as an internal data model.

In Example 28, the subject matter of Examples 25-27 includes, means for determining the state of the networked device in a reset state.

In Example 29, the subject matter of Examples 25-28 includes, means for determining the state of the networked device in an update state.

In Example 30, the subject matter of Examples 25-29 includes, means for determining state of the networked device in an operational state.

In Example 31, the subject matter of Examples 25-30 includes, the means for transforming the set of private attributes to the set of public attributes comprises: means for accessing a device unique identifier value from the set of private attributes, the device unique identifier value used to uniquely identify the networked device; means for applying the transformation function to the device unique identifier value to produce a temporary device identifier, the transformation function being a cryptographic hash function, adapted for operating when the state of the networked device is one of a reset state or an update state: and means for setting the set of public attributes to include the temporary device identifier, adapted for operating when the state of the networked device is one of a reset state or an update state.

In Example 32, the subject matter of Examples 25-31 includes, the means for transforming the set of private attributes to the set of public attributes comprises: means for accessing a device unique identifier value from the set of private attributes, the device unique identifier value used to uniquely identify the networked device; means for copying the device unique identifier value to a visible device identifier, adapted for operating when the state of the networked device is an operational state; and means for establishing the set of public attributes to include the visible device identifier, adapted for operating when the state of the networked device is an operational state.

In Example 33, the subject matter of Examples 25-32 includes, the means for transforming the set of private attributes to the set of public attributes comprises: means for accessing a plurality of values from the set of private attributes; means for applying the transformation function to combine the plurality of values to produce a combined value; and means for establishing the set of public attributes to include the combined value.

In Example 34, the subject matter of Examples 25-33 includes, means for accessing a first attribute value from the set of public attributes; and means for updating an attribute of the set of private attributes when the first attribute value from the set of public attributes is a predetermined value.

In Example 35, the subject matter of Example 34 includes, the means for updating the attribute of the set of private attributes comprises: means for updating the attribute of the set of private attributes based on a second attribute value from the set of public attributes.

Example 36 is a device fog adapted to perform the operations of any of Examples 1 to 35.

Example 37 is a device owner transfer service system adapted to perform the operations of onboarding invoked by any of Examples 1 to 35.

Example 38 is an Open Connectivity Foundation (OCF) device, configured as a server, client, or intermediary according to an OCF specification, comprising means to implement the operations of any of Examples 1 to 35.

Example 39 is an Internet of Things (IoT) network topology, the IoT network topology comprising respective communication links adapted to perform communications for the operations of any of Examples 1 to 35.

Example 40 is a network comprising respective devices and device communication mediums for performing any of the operations of Examples 1 to 35.

Example 41 is an apparatus comprising means for performing any of the operations of Examples 1 to 35.

Example 42 is a system to perform the operations of any of Examples 1 to 35.

The operations and functionality described above in these examples, and in the embodiments described with reference to FIGS. 3 to 6, may apply in a variety of network settings such as IoT networking, edge networking, fog networking, cloud networking, and all hybrids thereof. The operations and functionality of these examples and configurations may occur in a distributed fashion, including in distributed networked settings where one aspect of the functionality is performed by a first IoT edge device or edge network, another aspect of the functionality is performed by a fog network or platform, and yet another aspect of the functionality is performed by a cloud device or system. Further combinations which follow these shared, distributed, or grouping principles, as suggested in the examples and configurations above, can be employed. Accordingly, it will be evident that the functionality described herein may be operable to work within many permutations of the examples and configurations above, and like variations.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A device comprising:
communications circuitry;
processing circuitry; and
a memory device including instructions embodied thereon, wherein the instructions, which when executed by the processing circuitry, configure the processing circuitry to perform operations of a data transformation service to:
access a set of private attributes associated with a networked device, with use of the communications circuitry, the set of private attributes being visible to devices on a private network;
access a state of the networked device, with use of the communications circuitry;
transform the set of private attributes to a set of public attributes using a transformation function, the set of public attributes to become visible to devices on a public network, wherein the transformation function is altered by the state of the networked device, and wherein operations to transform the set of private attributes to the set of public attributes include operations to:
access a device unique identifier value from the set of private attributes, the device unique identifier value used to uniquely identify the networked device; and
apply the transformation function to the device unique identifier value to produce a temporary device identifier and establish the set of public attributes to include the temporary device identifier, when the state of the networked device is in a reset state or in an update state; and
expose the set of public attributes to the devices on the public network, with use of the communications circuitry.

2. The device of claim 1, wherein the set of private attributes is selected from a device data store.

3. The device of claim 1, wherein the set of private attributes is organized as an internal data model.

4. The device of claim 1, wherein the state of the networked device includes a reset state.

5. The device of claim 1, wherein the state of the networked device includes an update state.

6. The device of claim 1, wherein the state of the networked device includes an operational state.

7. The device of claim 1, wherein the transformation function is a cryptographic hash function.

8. The device of claim 1, wherein transformation of the set of private attributes to the set of public attributes is provided from operations that
copy the device unique identifier value to a visible device identifier and establish the set of public attributes to include the visible device identifier when the state of the networked device is in an operational state.

9. The device of claim 1, wherein transformation of the set of private attributes to the set of public attributes is provided from operations that:
access a plurality of values from the set of private attributes;
apply the transformation function to combine the plurality of values to produce a combined value; and
establish the set of public attributes to include the combined value.

10. The device of claim 1, the operations further to:
access a first attribute value from the set of public attributes; and
update an attribute of the set of private attributes when the first attribute value from the set of public attributes is a predetermined value.

11. The device of claim 10, wherein the update to the attribute of the set of private attributes includes an update to the attribute based on a second attribute value from the set of public attributes.

12. A method performed by a data processing device, comprising:
accessing a set of private attributes associated with a networked device, the set of private attributes being visible to devices on a private network;
accessing a state of the networked device;
transforming the set of private attributes to a set of public attributes using a transformation function, the set of public attributes to become visible to devices on a public network, wherein the transformation function is altered by the state of the networked device, and wherein transforming the set of private attributes to the set of public attributes comprises:
accessing a device unique identifier value from the set of private attributes, the device unique identifier value used to uniquely identify the networked device; and
applying the transformation function to the device unique identifier value to produce a temporary device identifier and establishing the set of public attributes to include the temporary device identifier, when the state of the networked device is in a reset state or in an update state; and
exposing the set of public attributes to the devices on the public network.

13. The method of claim 12, wherein the set of private attributes is selected from a device data store.

14. The method of claim 12, wherein the set of private attributes is organized as an internal data model.

15. The method of claim 12, wherein the state of the networked device includes a reset state.

16. The method of claim 12, wherein the state of the networked device includes an update state.

17. The method of claim 12, wherein the state of the networked device includes an operational state.

18. The method of claim 12, wherein the transformation function is a cryptographic hash function.

19. The method of claim 12, wherein transforming the set of private attributes to the set of public attributes comprises
copying the device unique identifier value to a visible device identifier and establishing the set of public attributes to include the visible device identifier when the state of the networked device is an operational state.

20. The method of claim 12, wherein transforming the set of private attributes to the set of public attributes comprises:
accessing a plurality of values from the set of private attributes;
applying the transformation function to combine the plurality of values to produce a combined value; and
establishing the set of public attributes to include the combined value.

21. The method of claim 12, further comprising:
accessing a first attribute value from the set of public attributes; and
updating an attribute of the set of private attributes when the first attribute value from the set of public attributes is a predetermined value.

22. The method of claim 21, wherein updating the attribute of the set of private attributes comprises:
updating the attribute of the set of private attributes based on a second attribute value from the set of public attributes.

23. At least one non-transitory machine-readable storage medium comprising instructions, wherein the instructions, when executed by a processing circuitry of a device, cause the processing circuitry to perform operations of a data transformation service, the operations comprising:
accessing a set of private attributes associated with a networked device, the set of private attributes being visible to devices on a private network;
accessing a state of the networked device;
transforming the set of private attributes to a set of public attributes using a transformation function, the set of public attributes to become visible to devices on a public network, wherein the transformation function is altered by the state of the networked device, and wherein transforming the set of private attributes to the set of public attributes comprises:
accessing a device unique identifier value from the set of private attributes, the device unique identifier value used to uniquely identify the networked device; and
applying the transformation function to the device unique identifier value to produce a temporary device identifier and establishing the set of public attributes to include the temporary device identifier, when the state of the networked device is in a reset state or in an update state; and
exposing the set of public attributes to the devices on the public network.

24. The machine-readable storage medium of claim 23, wherein the transformation function is a cryptographic hash function.

25. The machine-readable storage medium of claim 23, wherein transforming the set of private attributes to the set of public attributes comprises copying the device unique identifier value to a visible device identifier and establishing the set of public attributes to include the visible device identifier when the state of the networked device is an operational state.

\* \* \* \* \*